United States Patent
Calmon et al.

(10) Patent No.: US 11,868,810 B2
(45) Date of Patent: Jan. 9, 2024

(54) RESOURCE ADAPTATION USING NONLINEAR RELATIONSHIP BETWEEN SYSTEM PERFORMANCE METRIC AND RESOURCE USAGE

(71) Applicant: EMC IP Holding Company LLC, Hopkinton, MA (US)

(72) Inventors: Tiago Salviano Calmon, Rio de Janeiro (BR); Eduardo Vera Sousa, Niterói (BR); Vinícius Michel Gottin, Rio de Janeiro (BR); Amit Bhaya, Rio de Janeiro (BR); Oumar Diene, Rio de Janeiro (BR); Jonathan Ferreira Passoni, Duque de Caxias (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 135 days.

(21) Appl. No.: 16/741,962

(22) Filed: Jan. 14, 2020

(65) Prior Publication Data
US 2021/0149727 A1 May 20, 2021

Related U.S. Application Data

(60) Provisional application No. 62/935,759, filed on Nov. 15, 2019.

(51) Int. Cl.
*G06F 9/50* (2006.01)
*G06F 9/445* (2018.01)
(Continued)

(52) U.S. Cl.
CPC ............... *G06F 9/50* (2013.01); *G06F 9/445* (2013.01); *G06F 9/45541* (2013.01); *G06F 2209/501* (2013.01); *G06N 20/00* (2019.01)

(58) Field of Classification Search
CPC ..... G06F 9/4451; G06F 9/45533–5083; G06F 2209/501
See application file for complete search history.

(56) References Cited

U.S. PATENT DOCUMENTS

| 5,519,605 A * | 5/1996 | Cawlfield ............ G05B 13/048 700/31 |
| 7,039,559 B2 | 5/2006 | Froehlich et al. |

(Continued)

FOREIGN PATENT DOCUMENTS

CN 108881283 A 11/2018

OTHER PUBLICATIONS

Introduction to Control Theory And Its Application to Computing Systems Tarek Abdelzaher, Yixin Diao, Joseph L. Hellerstein, Chenyang Lu, and Xiaoyun Zhu Performance Modeling and Engineering—Chapter 7 (Year: 2008).*

(Continued)

*Primary Examiner* — Emerson C Puente
*Assistant Examiner* — Paul V Mills
(74) *Attorney, Agent, or Firm* — Ryan, Mason & Lewis, LLP

(57) ABSTRACT

Techniques are provided for allocating resources for one or more workloads. One method comprises obtaining a current performance of a workload; determining an adjustment to a current allocation of a resource allocated to the workload by evaluating a representation of a relationship between: (i) the current allocation of the resource allocated to the workload, (ii) a performance metric, and (iii) the current performance of the workload; and initiating an application of the determined adjustment to the current allocation of the resource for the workload. The performance metric may comprise a nominal value of a predefined service metric and the current performance of the workload may comprise a current value (Continued)

of a variable that tracks a given predefined service metric of the workload. An amount (or percentage) of the adjustment permitted for each iteration may be controlled. A sum of allocated resources can be constrained to an amount of available resources.

20 Claims, 11 Drawing Sheets

(51) Int. Cl.
*G06F 9/455* (2018.01)
*G06N 20/00* (2019.01)

(56) References Cited

U.S. PATENT DOCUMENTS

| | | | |
|---|---|---|---|
| 7,647,405 | B2 | 1/2010 | Bivens et al. |
| 7,827,361 | B1 | 11/2010 | Karlsson |
| 8,250,581 | B1 | 8/2012 | Blanding |
| 8,429,096 | B1 | 4/2013 | Soundararajan |
| 9,531,604 | B2 | 12/2016 | Akolkar et al. |
| 10,257,275 | B1 | 4/2019 | Dirac |
| 10,412,118 | B1 | 9/2019 | Davis et al. |
| 10,642,763 | B2 | 5/2020 | Longo |
| 2002/0055989 | A1 | 5/2002 | Stringer-Calvert et al. |
| 2005/0188088 | A1 | 8/2005 | Fellenstein |
| 2006/0280119 | A1* | 12/2006 | Karamanolis ......... G06F 9/5038 370/229 |
| 2006/0294044 | A1* | 12/2006 | Karlsson ............... G06Q 10/06 |
| 2007/0088532 | A1 | 4/2007 | Alvarez et al. |
| 2007/0162161 | A1* | 7/2007 | Kumar .................... G05B 11/32 700/29 |
| 2007/0234365 | A1 | 10/2007 | Savit |
| 2007/0252046 | A1* | 11/2007 | Miller .................. G05B 19/416 244/221 |
| 2007/0276512 | A1* | 11/2007 | Fan ...................... G05B 13/048 700/37 |
| 2007/0283016 | A1 | 12/2007 | Pendarakis et al. |
| 2008/0022285 | A1 | 1/2008 | Cherkasova |
| 2008/0180247 | A1 | 7/2008 | Deoalikar et al. |
| 2010/0091786 | A1* | 4/2010 | Liu ......................... H04L 67/10 370/419 |
| 2010/0168989 | A1 | 7/2010 | Gao |
| 2010/0201573 | A1 | 8/2010 | Lamming |
| 2010/0299655 | A1* | 11/2010 | Heisch ................. G06F 11/3409 717/130 |
| 2012/0110582 | A1 | 5/2012 | Ferdous et al. |
| 2013/0185433 | A1 | 7/2013 | Zhu |
| 2014/0128998 | A1* | 5/2014 | Sayyarrodsari ...... G05B 19/045 700/37 |
| 2014/0211811 | A1 | 7/2014 | Ludwig |
| 2015/0040133 | A1 | 2/2015 | Caulfield |
| 2015/0192907 | A1* | 7/2015 | Blevins .................. G05B 17/02 700/11 |
| 2016/0147203 | A1 | 5/2016 | Di Cairano |
| 2016/0162209 | A1 | 6/2016 | Calderone et al. |
| 2017/0048308 | A1 | 2/2017 | Qaisar |
| 2017/0161199 | A1 | 6/2017 | Shah |
| 2017/0242729 | A1 | 8/2017 | Chen et al. |
| 2017/0255491 | A1 | 9/2017 | Bradshaw et al. |
| 2018/0101214 | A1 | 4/2018 | Mahindru |
| 2018/0176089 | A1 | 6/2018 | Ritter et al. |
| 2018/0246482 | A1* | 8/2018 | Tian ...................... G05B 19/042 |
| 2018/0246558 | A1 | 8/2018 | Morad |
| 2018/0300176 | A1* | 10/2018 | Chen ...................... G06F 9/5027 |
| 2019/0075184 | A1 | 3/2019 | Seed, IV et al. |
| 2019/0101903 | A1 | 4/2019 | Katti et al. |
| 2019/0187631 | A1* | 6/2019 | Badgwell ............... G06N 3/006 |
| 2019/0266015 | A1 | 8/2019 | Chandra et al. |
| 2019/0319861 | A1 | 10/2019 | Pan et al. |
| 2020/0055523 | A1* | 2/2020 | Di Cairano ......... G05B 13/0235 |
| 2020/0167145 | A1 | 5/2020 | Franchitti et al. |
| 2020/0177671 | A1 | 6/2020 | Tofighbakhsh et al. |
| 2020/0301741 | A1 | 9/2020 | Gabrielson et al. |
| 2020/0341442 | A1* | 10/2020 | Meisner ............... G05B 19/048 |

OTHER PUBLICATIONS

Control strategies for adaptive resource allocation in cloud computing Tiago Salviano Calmon, Amit Bhaya. Oumar Diene, Jonathan Ferreira Passoni, Vinicius Michel Gottin, Eduardo Vera Sousa (Year: 2020).*
Towards Optimal Performance and Resource Management in Web Systems via Model Predictive Control Tharindu Patikirikorala, Liuping Wang and Alan Colman (Year: 2011).*
An assisting Model Predictive Controller approach to Control over the Cloud Per Skarin, Johan Eker Maria Kihlz, Karl-Erik Arze'n (Year: 2019).*
Design and performance of a scheduling framework for resizable parallel applications Rajesh Sudarsan, Calvin J. Ribbens (Year: 2010).*
Using Runtime Measured Workload Characteristics in Parallel Processor Scheduling Thu D. Nguyen, Raj Vaswani, and John Zahorjan (Year: 1996).*
SLOOP: QoS—Supervised Loop Execution to Reduce Energy on Heterogeneous Architectures M. Waqar Azhar, Per Stenström, and Vassilis Papaefstathiou (Year: 2017).*
Continuously Improving the Resource Utilization of Iterative Parallel Dataflows Lauritz Thamsen, Thomas Renner, Odej Kao (Year: 2016).*
Feedback Control of Computing Systems Joseph L. Hellerstein, Yixin Diao, Sujay Parekh, Dawn M. Tilbury (Year: 2004).*
Dynamic Performance Analysis: SelfAnalyzer Julita Corbalan, Xavier Martorell, Jesus Labarta Departament d'Arquitectura de Computadors (DAC), Universitat Politècnica de Catalunya (UPC) (Year: 2004).*
Enhancing the performance of malleable MPI applications by using performance-aware dynamic reconfiguration Gonzalo Martína, David E.Singh, Maria-Cristina Marinescu Jesús Carretero (Year: 2015).*
A Framework for Elastic Execution of Existing MPI Programs Aarthi Raveendran Tekin Bicer Gagan Agrawal (Year: 2011).*
Model Predictive Control Design for SISO LTI system subjected to bounded constraints Atul Katiyar, Ajay Yadav, Hari Kumar Singh (Year: 2018).*
Windup in Control Its Effects and Their Prevention Peter Hippe Chapters 1, 2, 7, and 9 (Year: 2006).*
A control theoretical view of cloud elasticity: taxonomy, survey and challenges Amjad Ullah, Jingpeng Li, Yindong Shen, Amir Hussain (Year: 2018).*
A Closed-Loop Controller to Ensure Performance and Temperature Constraints for Dynamic Applications Michail Noltsis, Nikolaos Zambelis, Dimitrios Soudris (Year: 2019).*
Atzori et al., "The Internet of Things: A survey," Computer Networks, 54 (2010) 2787-2805.
Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.
Bonomi et al., "Fog computing and its role in the internet of things," In Proceedings of the first edition of the MCC workshop on Mobile cloud computing (pp. 13-16). ACM, 2012.
Shi et al., "Edge computing: Vision and challenges," IEEE Internet of Things Journal, 3(5), 637-646.
Mahadev et al., "The Case for VM-Based Cloudlets in Mobile Computing, Pervasive Computing," IEEE, 8 (2009) 14-23.
Morabito et al., "Consolidate IoT edge computing with lightweight virtualization," IEEE Network, 32(1), 102-111.
Ismail et al., "Evaluation of docker as edge computing platform," In Open Systems (ICOS), 2015 IEEE Confernece on (pp. 130-135). IEEE.
Mahmud et al., "Fog computing: A taxonomy, survey and future directions," In Internet of Everything (pp. 103-130). Springer, Singapore.

(56) References Cited

OTHER PUBLICATIONS

Inaba et al., "Applications of weighted Voronoi diagrams and randomization to variance-based k-clustering," In Proceedings of the tenth annual symposium on Computational geometry (pp. 332-339). ACM.
Thönes, J. "Microservices." IEEE Software 32.1 (2015): 116-116.
Lewis et al., "Microservices," Available in: http://martinfowler.com/articles/microservices.html. Access in: Sep. 27, 2017.
Pahl et al., "Containers and clusters for edge cloud architectures—a technology review," In Future Internet of Things and Cloud (FiCloud), 2015 3rd International Conference on (pp. 379-386). IEEE.
Misra et al., "On Theoretical Modeling of Sensor Cloud: A Paradigm Shift From Wireless Sensor Network," IEEE Systems Journal, vol. 11, No. 2, pp. 1084-1093, Jun. 2017.
Taleb et al., "Mobile edge computing potential in making cities smarter," IEEE Communications Magazine, 55(3), 38-43.
Bouzeghoub, M., "A framework for analysis of data freshness," In Proceedings of the 2004 international workshop on Information quality in information systems (pp. 59-67). ACM.
"CEP," Available in: https://en.wikipedia.org/wiki/Complex_event_processing.
"Publish-subscribe pattern," Available in: https://en.wikipedia.org/wiki/Publish%E2%80%93subscribe_pattern.
Chatterjee et al., "Optimal Composition of a Virtual Sensor for Efficient Virtualization within Sensor-Cloud," in Proceedings of IEEE International Conferencce on Communications, Jun. 2015, pp. 448-453.
Yi et al., "A survey of fog computing: concepts, applications and issues." Proceedings of the 2015 Workshop on Mobile Big Data. ACM, 2015.
Santos et al., "Olympus: The cloud of sensors," IEEE Cloud Computing, 2(2), 48-56.
Delicato et al., "The Resource Management Challenge in IoT," In Resource Management for Internet of Things (pp. 7-18). Springer International Publishing (2017).
Wang et al., "ENORM: A framework for edge node resource management," IEEE Transactions on Services Computing (2017).
Skarlat et al., "Resource Provisioning for IoT Services in the Fog," 2016 IEEE 9th International Conference on Service-Oriented Computing and Applications (SOCA), Macau, 2016, pp. 32-39.
Roy et al., "DIVISOR: Dynamic Virtual Sensor Formation for Overlapping Region in IoT-based Sensor-Cloud," Proceedings of the IEEE Wireless Communications and Networking Conference, 2018.
Skarlat et al., "Optimized IoT service placement in the fog," Serv. Oriented Comput. Appl. 11, 4 (Dec. 2017), 427-443. DOI: https://doi.org/10.1007/s11761-017-0219-8 (2017).
Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets of Time Series—Nov. 2017 Dell EMC Confidential pp. 24 of 24 Communications (GreenCom) and IEEE Cyber, Physical and Social Computing (CPSCom) and IEEE Smart Data (SmartData), Exeter, 2017, pp. 792-799.
"Hypervisor," Available in: https://en.wikipedia.org/wiki/Hypervisor.
"EdgeX Foundry," Available in: https://www.edgexfoundry.org.
"Orion Context Broker," Available in: https://catalogue.fiware.org/enablers/publishsubscribe-context-broker-orion-context-broker.
"Fiware NGSI Open RESTful API Specification," Available in: http://forge.fiware.org/plugins/mediawiki/wiki/fiware/index.php/FIWARE_NGSI_Open_RESTful_API_Specification. Last accessed: Jun. 28, 2018.
"ZeroMQ," Available in: https://en.wikipedia.org/wiki/ZeroMQ.
U.S. Appl. No. 16/456,551, entitled "Adaptive Controller for Online Resource Allocation For Multiple Workloads," filed on Jun. 28, 2019.
U.S. Appl. No. 16/554,910, entitled "Early-Convergence Detection for Online Allocation Policies in Iterative Workloads," filed on Aug. 29, 2019.
U.S. Appl. No. 16/400,289, entitled "Adaptive Controller for Online Adaptation of Resource Allocation Policies for Iterative Workloads Using Reinforcement Learning," filed on May 1, 2019.
U.S. Appl. No. 16/401,604, entitled "Resource Allocation and Provisioning in a Multi-Tier Edge- Cloud Virtualization Environment," filed on May 2, 2019.
U.S. Appl. No. 16/554,897, entitled "Model-Based Initialization of Workloads for Resource Allocation Adaptation," filed on Aug. 29, 2019.
U.S. Appl. No. 16/263,135 entitled, "Adaptive Look-Ahead Configuration for Prefetching Data in Input/Output Operations," filed Jan. 31, 2019.
U.S. Appl. No. 16/397,596, entitled, "Adaptive Look-Ahead Configuration for Pre-Fetching Data in Input/Output Operations Based on Request Size and Frequency", filed Apr. 29, 2019.
U.S. Appl. No. 15/941,434, entitled, "Allocation of Shared Computing Resources Using Source Code Feature Extraction and Machine Learning", filed Mar. 30, 2018.
U.S. Appl. No. 16/039,743, entitled, "Allocation of Shared Computing Resources Using Source Code Feature Extraction and Clustering-Based Training of Machine Learning Models", filed Jul. 19, 2018.
U.S. Appl. No. 16/259,244, entitled, Building Neural Networks for Resource Allocation for Iterative Workloads Using Reinforcement Learning, filed Jan. 28, 2019.
Liu et al., "Adaptive Entitlement Control of Resource Containers on Shared Servers,"IFIP/IEEE International Symposium on Integrated Network Management, pp. 163-176, May 2005.
D. Merkel, "Docker: Ligtweight Linux Containers for Consistent Development and Deployment," Linux Journal, vol. 2, p. 239, (2014).
Betts et al., "Estimating the WCET of GPU-accelerated applications using hybrid analysis," Real-Time Systems (ECRTS), 2013.
K. Hornik, "Approximation capabilities of multilayer feedforward networks," Neural networks, vol. 2, No. 4, pp. 251-257, 1991.
Rawlings et al., "Model Predictive Control", Santa Barbara, CA: Nob Hill Publishing, pp. 339-366, 2018.
U.S. Appl. No. 15/497,803, entitled "Network-Based Combination of Heterogeneous Machine Learning Models," filed on Apr. 26, 2017.
U.S. Appl. No. 16/034,432, entitled "Resource Allocation and Provisioning in a Multi-Tier Edge-Cloud Virtualization Environment", filed on Jul. 13, 2018.
Abdelzaher et al., "Introduction to Control Theory And Its Application to Computing Systems", Performance Modeling and Engineering—Chapter 7 (Year: 2008).
Calmon et al., "Control strategies for adaptive resource allocation in cloud computing", 21st IFAC World Congress (Virtual), Berlin, Germany (Jul. 12-17, 2020).
Patikirikorala et al., "Towards Optimal Performance and Resource Management in Web Systems via Model Predictive Control", 2011 Australian Control Conference, Melbourne, Australia (Nov. 10 & 11, 2011).
Skarin et al., "An assisting Model Predictive Controller approach to Control over the Cloud", Lund University (May 15, 2019).
Huber et al. "Model-Based Self-Aware Performance and Resource Management Using the Descartes Modeling Language," in IEEE Transactions on Software Engineering, vol. 43, No. 5, pp. 432-452, May 1, 2017, doi: 10.1109/TSE.2016.2613863. (Year: 2017).

* cited by examiner

RESOURCE ADAPTATION USING NONLINEAR RELATIONSHIP BETWEEN SYSTEM PERFORMANCE METRIC AND RESOURCE USAGE

CROSS-REFERENCE TO RELATED APPLICATION(S)

The present application claims priority to U.S. Provisional Patent Application Ser. No. 62/935,759, filed Nov. 15, 2019, entitled "Resource Adaptation Using Nonlinear Relationship Between System Performance Metric and Resource Usage," incorporated by reference herein in its entirety.

FIELD

The field relates generally to information processing techniques, and more particularly, to techniques for allocating resources for one or more workloads.

BACKGROUND

Cloud computing has become increasingly popular due to a number of benefits. For example, cloud computing offers pay-per-use computation for customers and resource sharing for service providers. Through virtualization, a pool of computation devices can be abstracted and computational resources can be offered that are tailored to the needs of customers, who may contract for more computation as their needs grow.

Service providers aim to provide services to their customers while respecting Service Level Agreements (SLAs) and also minimizing resource usage. Using an infrastructure efficiently to execute workloads while respecting SLAs and, thus, satisfying a specified Quality of Service (QoS), poses a number of challenges. One challenge is that SLAs are typically set prior to execution of a job, but the execution environment is subject to a number of possible disturbances (e.g., poor knowledge about actual resource needs, demand peaks and/or hardware malfunctions). Thus, employing a fixed amount of allocated resources may not be a good solution.

A need therefore exists for improved techniques for resource allocation for one or more workloads.

SUMMARY

In one embodiment, a method comprises obtaining a current performance of at least one workload; determining an adjustment to a current allocation of at least one resource allocated to the at least one workload by evaluating a representation of a relationship between: (i) the current allocation of the at least one resource allocated to the at least one workload, (ii) a performance metric, and (iii) the current performance of the at least one workload; and initiating an application of the determined adjustment to the current allocation of the at least one resource for the at least one workload.

In some embodiments, the performance metric comprises a nominal value of a predefined service metric and the current performance of the at least one workload comprises a current value of a variable that tracks a given predefined service metric of the at least one workload. An amount (or percentage) of the adjustment permitted for each iteration may be controlled. A sum of all allocated resources can be constrained to a maximum amount of available resources.

Other illustrative embodiments include, without limitation, apparatus, systems, methods and computer program products comprising processor-readable storage media.

DETAILED DESCRIPTION

Figure 1:
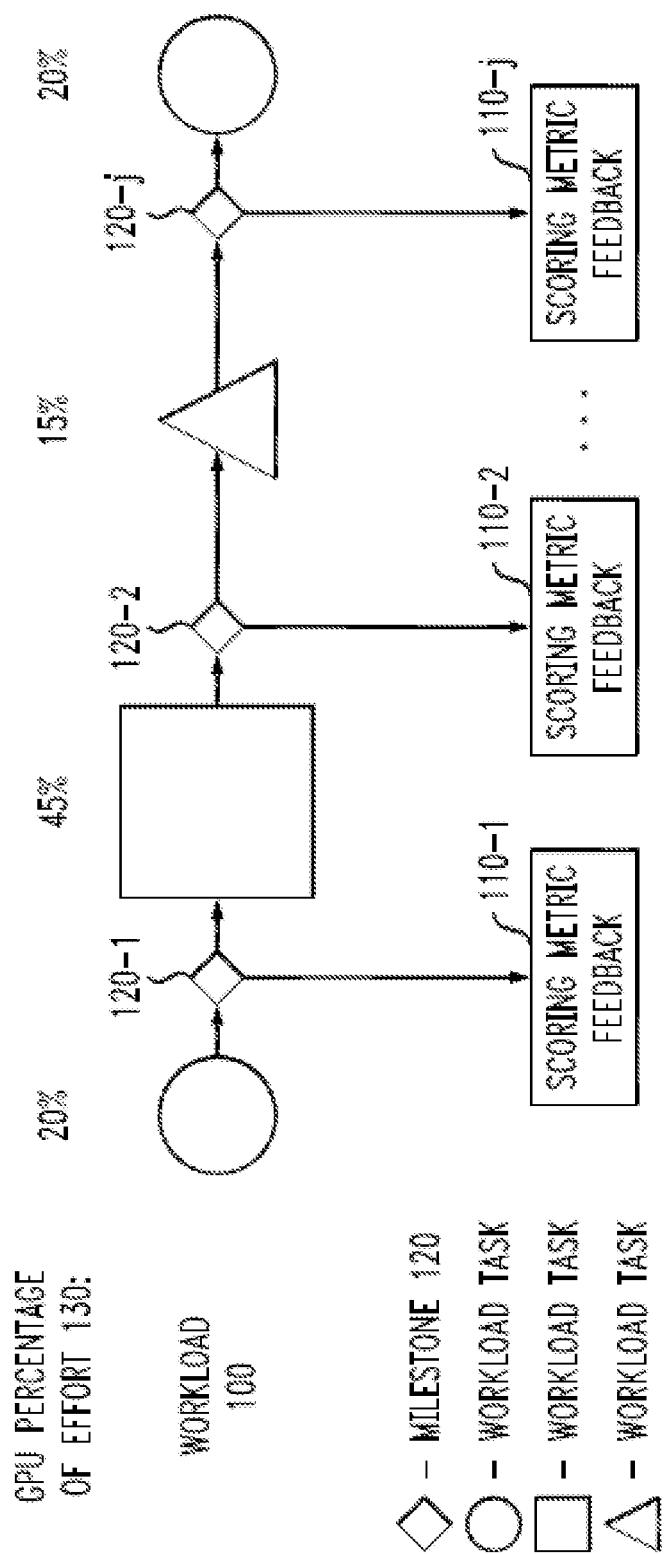
FIG. 1 illustrates a given workload with well-defined milestones and associated effort for a given infrastructure, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for allocating resources for one or more workloads.

One or more embodiments of the present disclosure provide control theory-based techniques to adapt the amount of resources allocated to a particular job. Control theory (specifically, for example, feedback control) has strong mathematical foundations and ensures important characteristics such as stability, resiliency to disturbances and robustness. Optimal control builds on top of that with additional interesting properties, such as optimality with respect to a function, scalability and constraint handling. As used herein, the terms "optimal" or "optimization" (and similar terms) shall encompass an absolute optimization, a substantial optimization, and any optimization that provides an improvement to a system performance by determining an adjustment to a current resource allocation relative to a performance metric (such as a difference between an instantaneous SLA value and a reference SLA value). An analytical control feedback is provided in some embodiments for a single workload and a control can be iteratively solved for multiple workloads.

U.S. patent application Ser. No. 16/456,551, filed Jun. 28, 2019, entitled "Adaptation of Resource Allocation for Multiple Workloads Using Interference Effect of Resource Allocation of Additional Workloads on Performance," (now U.S. Pat. No. 11,586,474), incorporated by reference herein in its entirety, provides techniques for adapting a resource allocation for multiple workloads. See also, U.S. patent application Ser. No. 16/554,897, filed Aug. 29, 2019, entitled "Initialization of Resource Allocation for a Workload Characterized Using a Regression Model," (now U.S. Pat. No. 11,327,801), and/or U.S. patent application Ser. No. 16/554,910, filed Aug. 29, 2019, entitled "Early-Convergence Detection for Online Resource Allocation Policies for Iterative Workloads," (now U.S. Pat. No. 11,113,171), each incorporated by reference herein in their entirety.

Over the last few years, cloud computing has gained the attention of businesses because of its benefits, which include pay-per-use computation for the customers and resource sharing for the providers. Through virtualization, it is possible to abstract a pool of computation devices and offer computational resources better tailored to the needs of customers, who might contract more computation as their necessities grow.

In cloud computing environments, a number of resource abstractions have emerged, such as containers. Containers allow providers to offer computation without customers knowing which underlying infrastructure is executing the software code. This can be achieved in the Platform-as-a-Service (PaaS) paradigm and also the Function-as-a-Service (FaaS) paradigm (also known as serverless computing).

In the PaaS and FaaS paradigms, the usual agreements regarding a QoS expected by the customer are expressed through several SLAs. SLAs may include, for example, response time, execution time and uptime percentage. The levels of SLAs are usually agreed upon prior to the service through reference values often referred to as SLA metrics, and must be followed. If the SLA agreements are not satisfied, the providers must typically pay fines and may also diminish the trust that a customer perceives of the service.

One way to ensure that SLAs are satisfied is to dedicate an amount of resources to them. There are two problems with this approach. Firstly, in general, an application cannot be assumed to be bounded by one particular resource. Some applications, for example, might have an IO-intensive phase and, afterwards, a compute-intensive phase. Dedicating resources to an application in such a scenario might be inefficient, resulting in spare resources at the different phases of the application. In addition, the initial estimate of how many resources are needed to run an application might be either oversized or undersized.

While SLAs are typically set prior to the execution of a job, the execution environment is quite dynamic. New workloads might come and compete for resources and unplanned demand peaks might occur, which may disrupt the original workload planning due to tasks with higher priorities, a greater need to share the environment and/or overheads because of context switching.

Service providers aim to provide services to their customers while respecting SLAs and minimizing resource usage. This is the scenario that provides the optimal profit for them. To do so, a static approach of allocation, which dedicates resources to a job from its start through its completion, is naturally inefficient, and, thus, sub-optimal. In one or more embodiments, a methodology is provided to dynamically allocate resources based on feedback of the workload execution and prior knowledge of workload stages.

In some embodiments, automatic adaptation of the infrastructure is provided to accommodate workload necessities, as defined by their particular SLAs. The disclosed mechanism measures a current performance of a workload, the reference levels and iteratively solves quadratic optimization problems. This mechanism makes it possible to perform on-the-fly adaptations and to improve profit generation by respecting the SLAs associated with the workloads with higher profit generation potential (or, the ones that lead to the highest fines, if not respected).

A characteristic of infrastructure provision is the variability in perceived demand. Since service providers are willing to charge an amount per computation usage, and these providers can have a lot of customers, it is natural that the demand varies within different time frames, on a daily basis, a weekly basis and even a monthly basis. This variation of demand itself imposes a number of challenges, since the intention of the provider is to serve each customer at the level of service defined in contract.

The aforementioned contracts, materialized in multiple SLAs, also impose a significant challenge: they are set prior to the service provisioning. This means that, no matter what happens at the time of execution, these SLAs must be respected. Examples of events that could disrupt providers include but are not limited to sharp demand peaks, malfunction of machines and unrealistic contracts. In some cases, it is not possible to reach every single SLA, and it is also an important decision to prioritize some of the workloads to the detriment of others.

More specifically, the problem of dynamically controlling the allocation of resources for multiple concurrent workloads is highlighted, so as to minimize SLA infringements. A method that provides optimality guarantees regarding reference values of the metrics of interest is desired, taking into account characteristics such as stability, resiliency to disturbances and robustness.

Furthermore, this method should be robust enough to deal with resource limitations. When multiple workloads need resources, and the amount of resources requested exceeds the available resources at that point in time, the workload orchestrator must be able to ponder between multiple necessities and evaluate the trade-offs to reach a conclusion of which workloads to serve properly and which ones will infringe on their respective SLAs.

Figure 2:
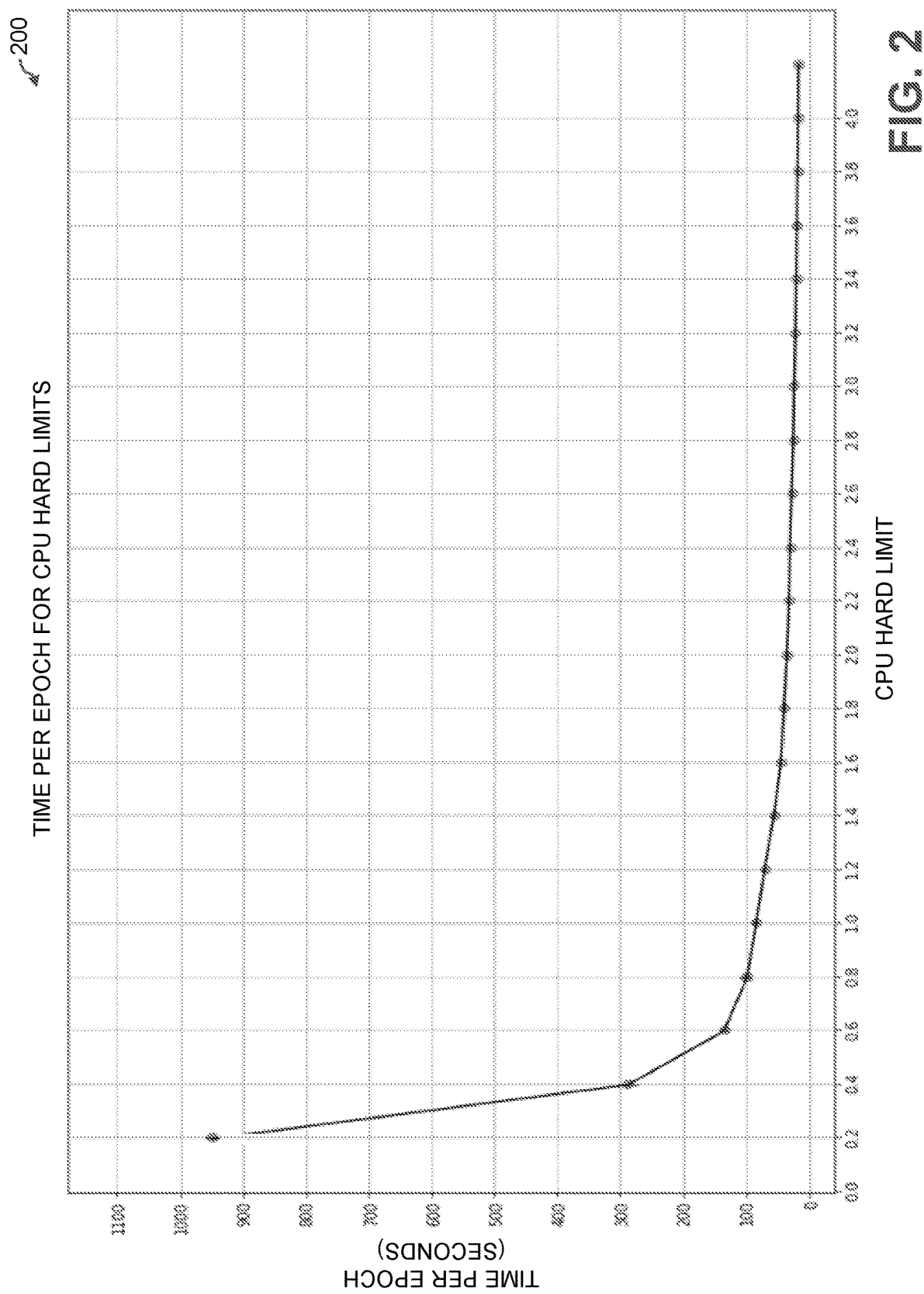
FIG. 2 illustrates a nonlinear relationship between resource usage and a performance metric, according to at least one embodiment.

One or more embodiments of the disclosure provide a mechanism for optimal control for multiple workloads. This mechanism is optimal with respect to a function of the amount of time it takes to complete an iteration (or another SLA metric), compared to reference levels, and the usage of the compute resource (or another resource). This function can assume many forms. In some embodiments of the present disclosure, the function is derived directly from the curve of resource consumption. FIG. 2, discussed below, shows a typical curve for resource consumption. Such curves can be obtained in any typical execution environment by measuring past executions of similar workloads under various allocation policies.

FIG. 1 illustrates a given workload 100 with well-defined milestones 120 and associated effort 130 for a given infrastructure, according to one embodiment of the disclosure. One example of this kind of job is the training of a Deep Neural Network, which is typically performed in fixed-size iterations. It is assumed that workload 100 will produce information feedback 110-1 through 110-*j*, such as a scoring metric feedback 110-1, a scoring metric feedback 110-2, and a scoring metric feedback **110-*j***.

As shown in Adam Betts and Alastair F. Donaldson, "Estimating the WCET of GPU-Accelerated Applications Using Hybrid Analysis," *Real-Time Systems (ECRTS)* (2013), incorporated by reference herein in its entirety, ultimately, source code can be instrumented to perform such actions. So, this step is considered feasible for all kinds of jobs. In more well-behaved and specific embodiments, the source code is instrumented with intermediate feedback as a design decision.

As shown in FIG. 1, the percentage of effort 130 for a given infrastructure, such as a graphics processing unit (GPU), is indicated between each exemplary milestone 120-1 through **120-*j* of the given workload 100** (e.g., a job).

FIG. 2 illustrates a nonlinear relationship 200 between resource usage (e.g., CPU usage) and a performance metric, such as a response time SLA, according to at least one embodiment of the disclosure. While the example of FIG. 2 represents an exemplary relationship between a particular resource (e.g., CPU) and SLA (e.g., execution time per epoch), the disclosed resource allocation techniques can be employed for any resources and SLAs, as would be apparent to a person of ordinary skill in the art, based on the present disclosure. For example, the disclosed resource allocation techniques can be applied to other resources, such as memory, processing, and network resources (e.g., if a given workload is network bound).

The behavior shown in the curve depicted in FIG. 2 leads to consideration of non-linear models of the form:

$$x[k+1]=x[k]+b(x)\cdot u[k],$$

where u is the amount of resources, x is the corresponding execution time of an iteration and b is the rate at which a change in the allocation affects execution times (usually a negative number). This parameter is the source of the non-linearity, and needs to be estimated over time. This parameter can also be yielded by a Taylor series transform, as follows:

$$u[k]=f(x[k]);$$

$$x[k+1]=g(u+\Delta u[k]);$$

$$x[k+1]=g(f(x[k])+\Delta u[k]);$$

$$x[k+1]=g(f(x[k]))+g'(u[k])\Delta u[k]+O(g'');$$

$$x[k+1]=x[k]+g'(u[k])\Delta u[k],$$

where $f(\cdot)$ is a function that maps current time x into a new allocation u, $g(\cdot)$ is a function that translates a new allocation u+Δu into a new execution time x[k+1]. The subsequent equations are a Taylor expansion of the relation, and higher order terms (e.g., higher derivatives) of $g(\cdot)$ are not considered in the analysis, in some embodiments. This analysis is followed by linearizing these dynamics to:

$$x[k+1]=x[k]+b(x)u[k],$$

where u[k] represents an increment in the amount of used resources. One or more aspects of the disclosure recognize that this dynamic equation allows the disclosed analytical solution to the optimal control problem for a single workload can be provided.

Single Workload Optimal Control

The optimal control problem is formalized to be solved iteratively. In some embodiments, this problem can be solved efficiently with several available optimization tools or, for the specific case of a single workload, solved analytically and then an optimal update rule is generated for the controller.

One goal is to reach a desired service level in terms of execution time, referred to herein as the reference r, subject to the dynamics imposed by the real system, which were previously modeled using a first-order approximate Taylor expansion of the real, non-linear model.

Initially, the problem for a single workload is analytically solved. Mathematically, this can be represented by:

$$J(x[k],u[k])=w_x(x[k]-r)^2+w_u(u[k])^2.$$

This equation ponders the deviation from the reference value with a weight $w_x$ and the usage of computational resources with another weight $w_u$. These weights represent, respectively, an importance of tracking the set-points regardless of the shifts in resource usage and an importance of those shifts. Using an exact model, the proportion should be in favor of $w_x$. Due to the linearization, $w_u$ tends to be more important, since it may not be advisable to drift much from the current point of operation. The optimal problem is, then, represented by:

$$\min_u \; J(x,u) = w_x(y-r)^2 + w_u(u)^2, \text{ (e.g., a quadratic representation)},$$

$$\text{such that } y = x - b(x)\cdot u.$$

Alternatively, in a more compact form and without loss of generality:

$$\min_u \; J(x,u) = w(x - b(x)u - r)^2 + u^2,$$

where $$w = \frac{w_x}{w_u}$$

is an explicit ponderation of how much one cares about the tracking power and the drift in allocation, respectively.

The following describes the disclosed analytic resolution to the single workload resource allocation problem described above, according to some embodiments. First, to find a local extremum, a derivative is applied to the function J with respect to u, as follows:

$$\frac{\partial J}{\partial u} = -2wb(x)(x - b(x)u - r) + 2u.$$

Taking the left-hand side, and equaling the left-hand side to zero provides:

$$u^* = \frac{wb(x)}{(1 + wb(x))^2}(x - r),$$

which is a substantially minimum point since $J''= 2(wb(x)^2+1)>0$ for every w>0.

In at least some embodiments, the variable u* represents an algebraic form derived from an analytical solution of the above quadratic representation for the single workload.

Thus, in one embodiment, an adjustment to a current allocation of one or more resources allocated to a workload is determined by obtaining a current performance of at least one workload (e.g., a current value of a variable that tracks a given predefined service metric of the workload, such as a predefined SLA); evaluating a representation of a relationship between: (i) the current allocation of the at least one resource allocated to the at least one workload, (ii) a performance metric (e.g., a nominal value of a predefined service metric, such as time-to-finish or down time), and (iii) the current performance of the at least one workload (e.g., a current value of a variable that tracks a given predefined service metric of the at least one workload); and initiating an application of the determined adjustment to the current allocation of the at least one resource for the at least one workload.

The amount (or percentage) of the adjustment permitted for each iteration may optionally be controlled.

Optimal Control Problem for Multiple Workloads

The above analytical solution to the optimal control problem for a single workload can be leveraged to define a solution to the problem in the context of multiple workloads. Thus, one or more embodiments provide an optimal control strategy that solves the problem of allocating multiple workloads in a single, finite resource machine. First, the maximum amount of resources to be shared among all workloads $U_{MAX}$ is defined. Then, the linear version of the problem in a multi-dimensional space with dimension d, is redefined where d is the number of currently controlled workloads, at iteration k. The dynamic system is given by:

$$x[k+1]=x[k]+B(x[k])u[k]$$

where boldfaced x and u are now d-dimensional vectors and B is a time-varying d×d Matrix for the multiple workloads. Consider the analogous optimal control problem:

$$\min_{u} \; J(x, u) = w\|x[k] - x_{ref}\|^2 + \|u[k]\|^2,$$

(e.g., a quadratic representation), such that $x[k + 1] = x[k] + B(x[k])u[k]$ $\vec{1}^T u[k] \leq U_{MAX}$ $x \geq 0.$ Thus, in one embodiment, an adjustment to a current allocation of one or more resources allocated to multiple workloads is determined by obtaining a current performance of the multiple workloads (e.g., a current value of a variable that tracks a given predefined service metric of the workloads); and, for each iteration, solving a representation of a relationship between: (i) the current allocation of the at least one resource allocated to the multiple workloads, (ii) a performance metric (e.g., a nominal value of a predefined service metric, such as time-to-finish or down time), and (iii) the current performance of the multiple workloads (e.g., a current value of a variable that tracks a given predefined service metric of each workload); and initiating an application of the determined adjustment to the current allocation of the at least one resource for the at least one workload. The amount (or percentage) of the adjustment permitted for each iteration may optionally be controlled. The sum of all allocated resources may optionally be constrained to a maximum amount of available resources.

In at least one mode of some embodiments of the present disclosure, this problem is solved iteratively as in Model Predictive Control (MPC), as described, for example, in J. B. Rawlings et al., Model Predictive Control, Santa Barbara Calif., Nob Hill Publishing, 2018, incorporated by reference herein in its entirety, which subsequently solves the optimal control problem for a finite number of steps. After that, it takes the immediate control action and applies the control action to the plant. A new state is, then, observed and a new optimal control problem is solved.

In other embodiments of the present disclosure, this problem could be solved in one-shot approaches through appropriate techniques such as Dynamic Programming or Quadratic Programming, as described, for example, in Adam Betts and Alastair Donaldson, referenced above.

Another aspect of this kind of solution is that it allows setting a maximum level of resources $U_{MAX}$ and making explicit that this value cannot be exceeded. If the amount of resources available is not enough to comply with the SLAs of all executions, the optimization procedure can decide which ones are going to be SLA compliant and which ones are not (criteria, for example, embedded into the optimization, can prioritize those closer to set point, or a weighting can be employed in some embodiments based at least in part on user-defined priorities).

Figure 3:
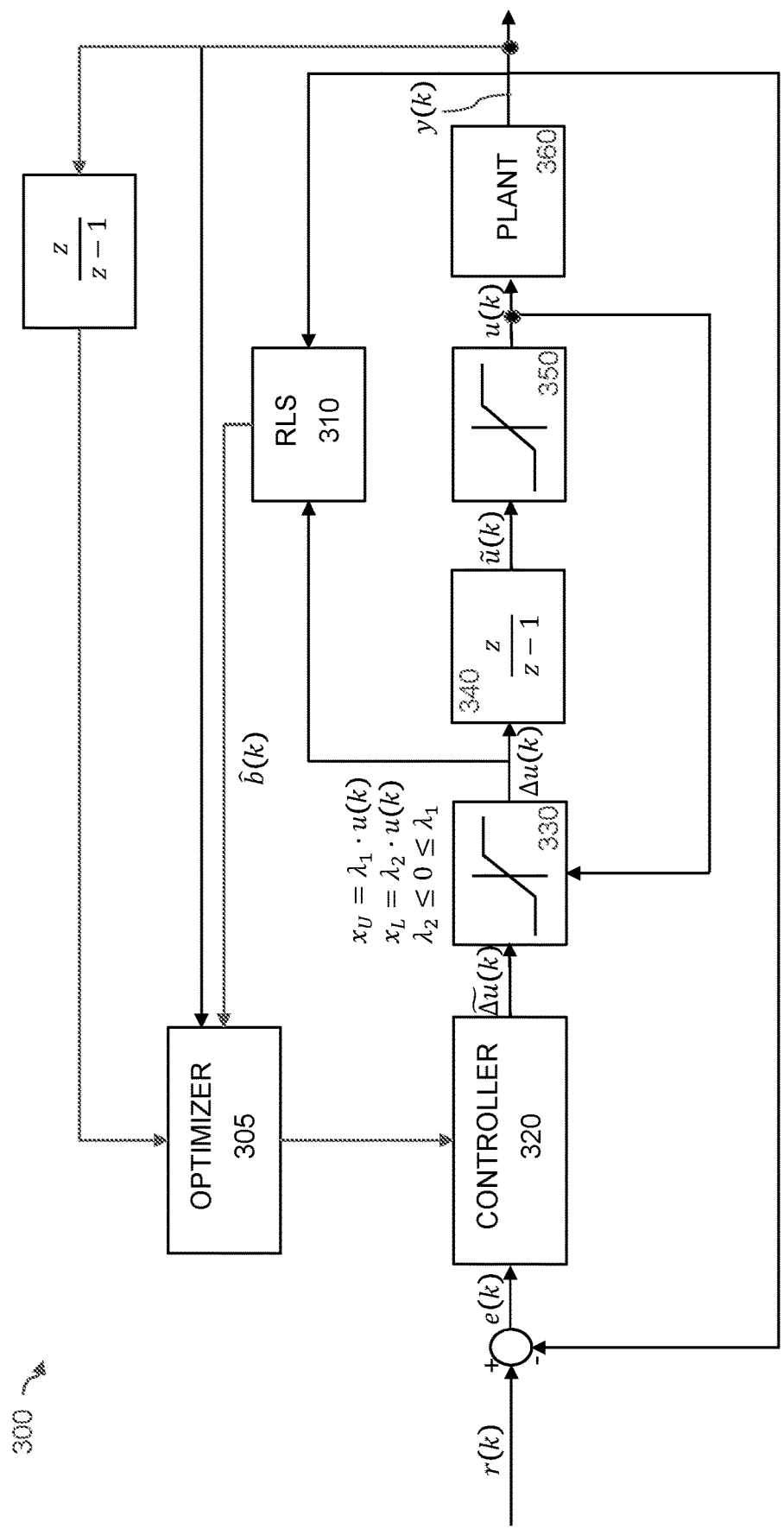
FIG. 3 illustrates a feedback loop comprising an optimizer, according to some embodiments.

FIG. 3 illustrates a feedback loop 300 comprising an optimizer 305 (where the optimizer 305 comprises the evaluation), according to some embodiments. For an additional discussion of a number of components in FIG. 3, see, for example, U.S. patent application Ser. No. 16/456,551 (now U.S. Pat. No. 11,586,474), referenced above and incorporated by reference herein in its entirety. As shown in FIG. 3, in some embodiments, a Recursive Least Squares (RLS) module 310 learns system parameters b(k), which are generated by the relation between the amount of resources added (u(k)) and the response time of the particular step y(k)).

A proportional controller 320 takes the learned parameter $\hat{b}(k)$ and uses the parameter, $\hat{b}(k)$, to modify the feedback loop dynamics, which is fed by (r(k)−y(k)=e(k)), where r(k) is a target value of a scoring metric of interest, such as a target response time, and y(k) is the current value of the scoring metric, such as the response time of the particular step, to obtain an error, e(k).

The relation of the amount of resources added (u(k)) and the response time of the particular step y(k) is assumed to be piecewise linear, and a saturation module 330 is added after the controller 320 in order to bound the error between the assumed dynamics and the actual dynamics. In some embodiments, the saturation module 330 is adaptive as well, and has two parameters, $\lambda_1$ and $\lambda_2$. These two parameters, $\lambda_1$ and $\lambda_2$, are associated with a trade-off between allowed oscillation around the set-point and convergence rates. The smaller the absolute value of these parameters are, the less the system will oscillate, but convergence will be slower.

In the embodiment of FIG. 3, an integrator block 340, a saturation block 350 and a plant block 360 represents the system. As shown in FIG. 3, the output of the saturation module 330 is processed by the integrator block 340, represented by the equation $$\frac{z}{z-1},$$

representing and integer block in the Z-transform domain. The integrator block 340 represents that, in some embodiments, the output from the controller 320 and initial saturation module 330 is an increment in the current allocation, rather than a full allocation. To illustrate, suppose an allocation at time instant k is x(k)=4.1, the control output from the saturation module 330 is u(k)=0.1 and model parameter a=1. A next allocation according to equation (1) will be x(k+1)=4.1+0.1=4.2, instead of just 0.1, which means that the integrator block 340 will sum the contribution of the current control output, u(k), to the current allocation to obtain a new allocation.

The output of the integrator block 340 is processed by saturation block 350, which prevents the allocation from exceeding the amount of available resources (e.g., processing cores, memory or network bandwidth available) of the device. Thus, the inferior limit of the saturation block 350 is 0 in most implementations and the superior limit of the saturation block 350 is MAX_RESOURCE, where MAX_RESOURCE is the number of processing cores, amount of memory or amount of network bandwidth available of the device, depending on the resource that is being controlled (computation, memory or network, respectively). Finally, the plant block 360 translates the allocation, x(k), into a new SLA metric, y(k). In other words, the plant block 360 is typically implemented as a highly nonlinear function modeled as a first-order differential equation that continually learns the system model, $\hat{b} \sim b$, at each iteration.

Figure 4:
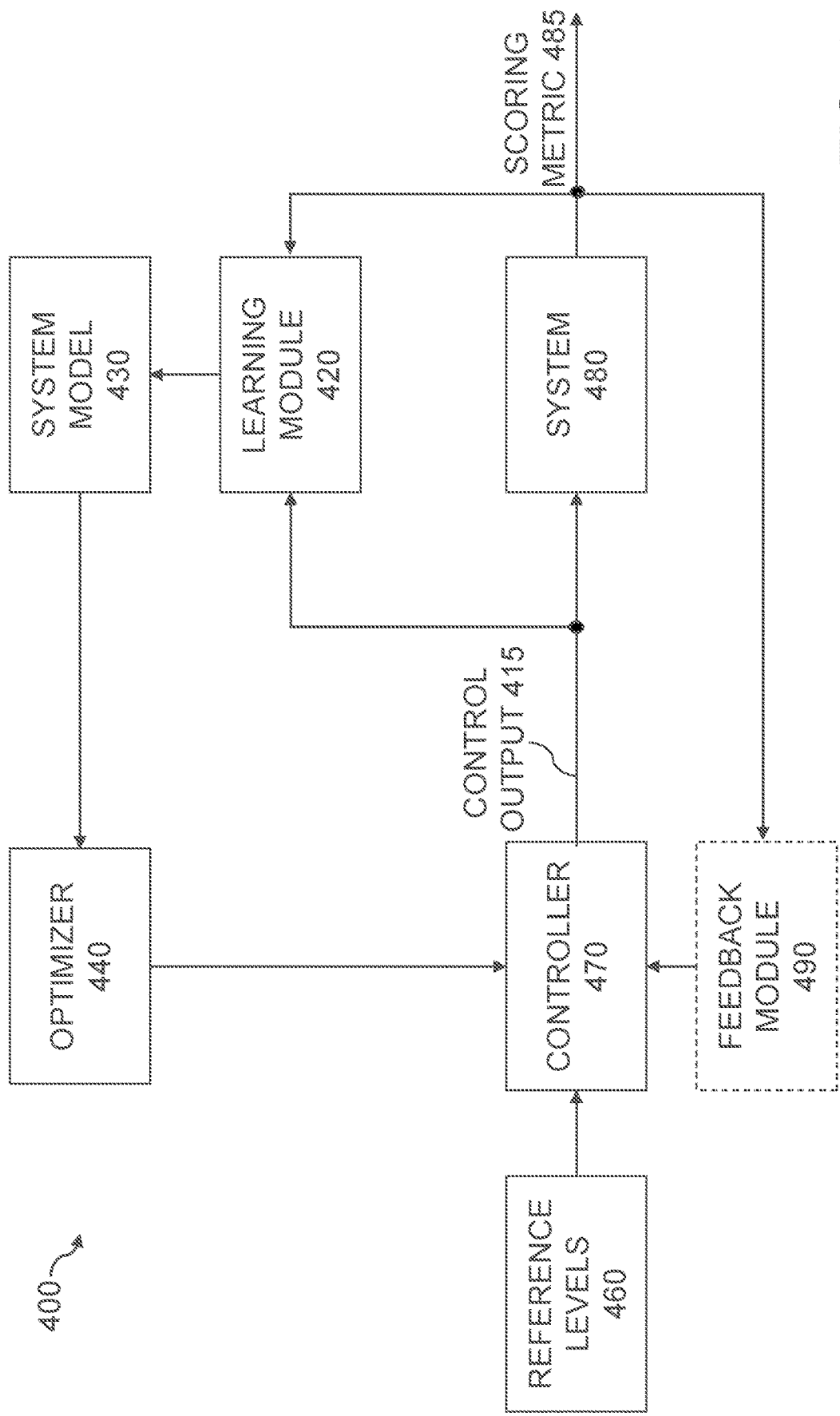
FIG. 4 is flow block diagram illustrating a resource allocation activity loop for the feedback loop of FIG. 3, according to one or more embodiments.

FIG. 4 is flow block diagram 400 illustrating the resource allocation activity loop for the feedback loop 300 of FIG. 3, according to one or more embodiments. Generally, in at least some embodiments, the optimizer 440 of FIG. 4 is called at every iteration and optimizes system performance by determining an adjustment to a current resource allocation relative to a performance metric, for a fixed number of steps. The next action is taken, a new metric is collected, and, then, the optimizer 440 is invoked once again.

As shown in FIG. 4, the block diagram 400 comprises a learning module 420, a system model 430, and the optimizer 440, discussed below. The learning module 420 processes a control output 415 from the controller 470, such as the amount of resources added (u(k)), and a scoring metric 485, such as a response time of a particular processing step.

Likewise, the block diagram 400 suggests changes to the allocated amount of resources in order to ensure the SLA. The exemplary block diagram 400 generates a current value of the scoring metric 485 and comprises a set of reference levels 460, the controller 470, a system 480 and a feedback module 490.

In the embodiment of FIG. 4, the optimizer 440 determines an adjustment to the current allocation of one or more resources allocated to one or more workloads, and the adjustment is provided to the controller 470 to implement in the system 480 (e.g., the execution environment for the one or more workloads), using one or more of the reference levels 460 (e.g., target values for one or more SLAs). The system 480 provides the one or more scoring metrics 485 indicating the actual values of each SLA. The scoring metrics 485 are optionally applied to the controller 470 using a feedback module 490, as shown in FIG. 4, to measure the error between the current and target values for the one or more SLAs. The optimizer 440 employs the system model 430 that provides an estimate of how the system will react if the determined allocation adjustment is implemented in the system. A learning module learns parameters of the system model that provide a magnitude of a relationship between the SLAs and the resources.

One or more embodiments provide techniques for the dynamic allocation of resources for one or more workloads under an optimal control problem configuration.

In some embodiments, a feedback control law is provided by analytically solving the optimal control problem of resources pondering deviations from the SLA and usage of computational power. This analytical feedback law solves the optimal control for a single workload and, if greediness is assumed, can even be extrapolated to multi-workload harmlessly.

In at least one embodiment, the optimal resource allocation problem is addressed for a number of workloads sharing the same machine. Among other benefits, because the optimal control is quadratic, the solution to this problem can scale to thousands of decision variables, should that be the case.

An automatic, optimal decider selects actions in some embodiments, when the amount of resources is constrained. The resource constraint is explicitly added into the optimization formulation in some embodiments. Thus, only solutions that respect these constraints are feasible solutions in such an embodiment. The disclosed optimization procedure, then, finds the substantially best solution in terms of SLA compliance by also respecting the physical resource constraint present in every execution environment.

EXAMPLES

One Workload with Analytical Optimal Feedback Control Law

Training Deep Learning models is one common task that is very resource intensive. The characteristic of the job is to be performed in fixed-size iterations, and each iteration is referred to as an epoch in some embodiments. The number of training epochs is a parameter, which means the milestones of the job can be defined, and at each iteration, the rate of completion in percentage will be 100*i/n %, where i is the epoch number and n is the number of epochs specified. More granular milestones can be used in this particular example since processing each batch within an epoch is also a fixed size task, but this choice makes the mechanism prone to noisy control actions.

Assuming that the SLA metric to be controlled is the execution time et=T, one can feedback the amount of time t it took to complete an epoch and compare this time to the desired time per epoch, which is T/n. If an epoch took longer than T/n to finish, more resources might me be needed. On the other hand, if the time t is significantly smaller than T/n, this indicates that the job may not need the amount of resources allocated to it and reducing the allocation can decrease costs and even make room for other jobs to run, for example.

Docker, a lightweight container solution for multiple Operating Systems (OS) offers controls over CPU and memory limits. See, for example, D. Merkel, "Docker: Lightweight Linux Containers for Consistent Development and Deployment," *Linux Journal*, Vol. 2, 239 (2014), incorporated by reference herein in its entirety.

Figure 5:
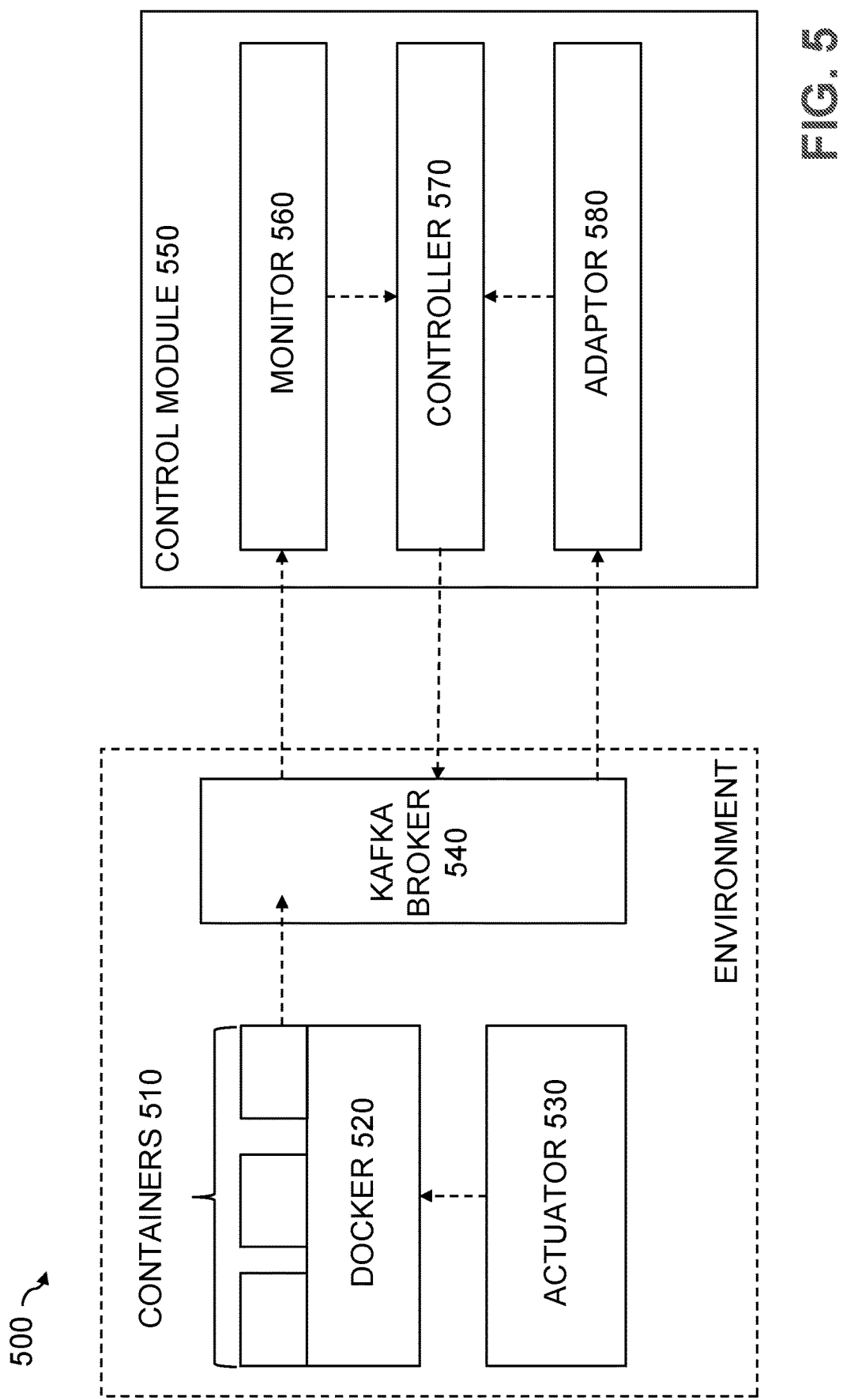
FIG. 5 illustrates one implementation of the disclosed resource allocation adaptation techniques for one or more workloads, according to some embodiments of the disclosure.

FIG. 5 illustrates an exemplary implementation 500 of the disclosed resource allocation adaptation techniques for one or more workloads, according to some embodiments. The exemplary implementation 500 uses a plurality of containers 510, such as Docker containers, that execute the iterative workloads in a shared execution environment, to implement the controller 470 of FIG. 4. As noted above, Docker is a well-known lightweight container solution for multiple OSs, offering controls over CPU and memory limits.

In some embodiments, one of the containers 510-$i$ is chosen as the controller container (corresponding to the system of FIG. 4) and metrics are measured in real-time. The exemplary implementation 500 uses Docker 520 as the shared execution environment and the adaptive controller disclosed herein. Messaging between the Docker 520 and a control module 550 is implemented in the embodiment of FIG. 5 using a KAFKA message broker 540, in a known manner. The control module 550 comprises a monitor 560, a controller 570 and an adaptor 580. The exemplary monitor 560 is a possible implementation of the feedback module 490, controller 570 implements the elements in the correction engine of FIG. 4 and the adaptor 580 implements the mechanisms in the adaptation engine of FIG. 4, and operate in a similar manner as described above.

At the end of each iteration, the containers 510 send its performance metric to the KAFKA message broker 540, from which the monitor 560 and adaptor 580 is listening. The monitor 560 takes the metric and sends it to the controller 570. Adaptor 580 infers a new parameter $\hat{b}$ and also sends it to the controller 570. Finally, the controller 570 generates a new increment in allocation, which is sent to an actuation topic of KAFKA message broker 540. The actuator 530 is listening to this topic, and changes allocation when a new message arrives.

Figure 6:
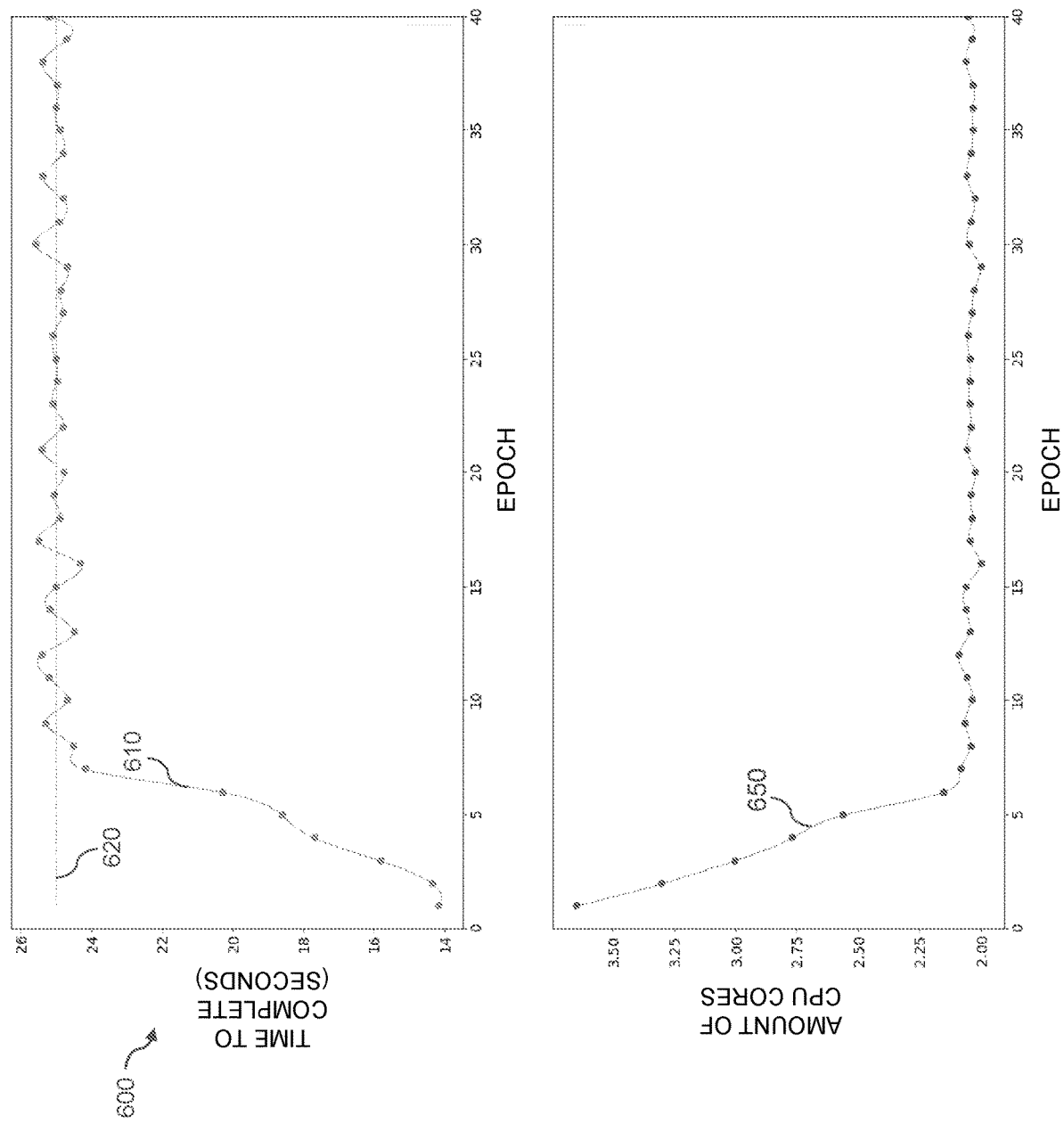
FIG. 6 illustrates an exemplary time to complete performance metric and a number of cores used for each iteration, according to one or more embodiments.

FIG. 6 illustrates an exemplary relationship 600 between a time to complete performance metric 610 and a number of CPU cores 650 used for each iteration, according to some embodiments. The time to complete performance metric 610 is shown in FIG. 6 relative to a corresponding set-point 620. In some embodiments, the set-point 620 corresponds to a nominal value of the time to complete performance metric 610 (or another SLA). FIG. 6 shows that the control mechanism converges to desired levels and stabilizes the usage of CPU cores.

Multiple Workloads with Subsequent Optimizations

Figure 7:
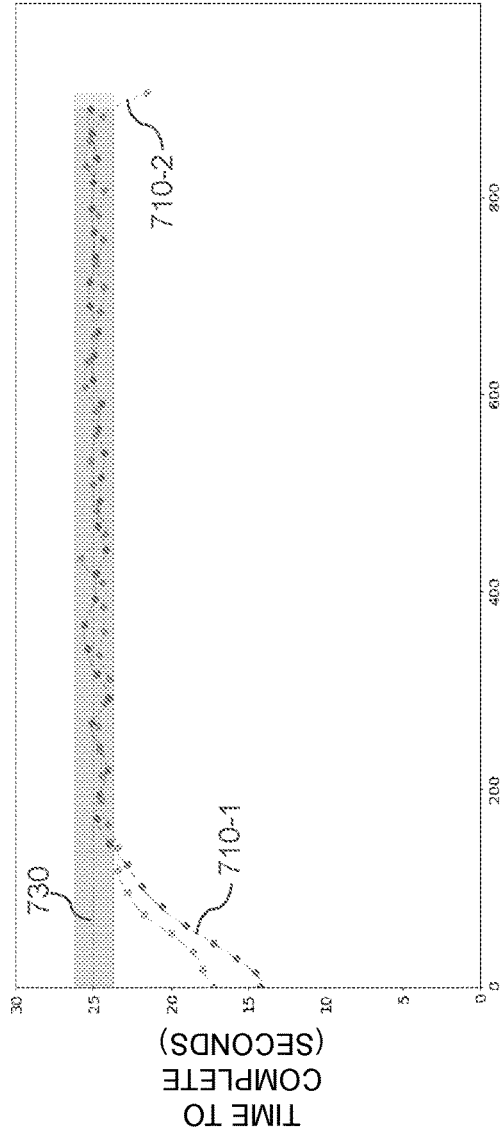
FIG. 7 illustrates an execution of two concurrent workloads, according to at least one embodiment of the disclosure.
Figure 7:
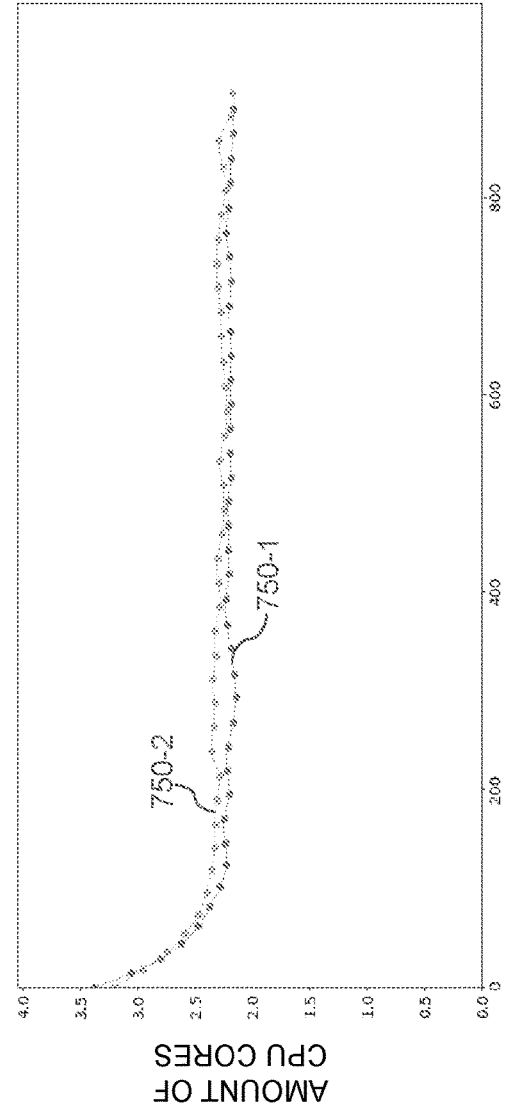

Concurrent containers can be executed using an optimizer 305, 440 at each iteration. These workloads will interfere with one another for resources and cause disturbances. Nonetheless, FIG. 7 illustrates an execution 700 of two concurrent workloads with a set-point of 25.0 seconds, according to at least one embodiment, and the disclosed schema is able to smoothly control both workloads to their specified set-points. The time to complete performance metrics 710-1, 710-2 are shown in FIG. 7 for the two concurrent workloads 1 and 2 as a function of the aggregated times 720 (in seconds). The amount of CPU cores 750-1, 750-2 is shown in FIG. 7 for the two concurrent workloads 1 and 2 as a function of the aggregated times 760 (in seconds). The time to complete performance metrics 710-1, 710-2 is shown in FIG. 7 relative to a corresponding set-point 730 (and, optionally, a set-point range).

Figure 8:
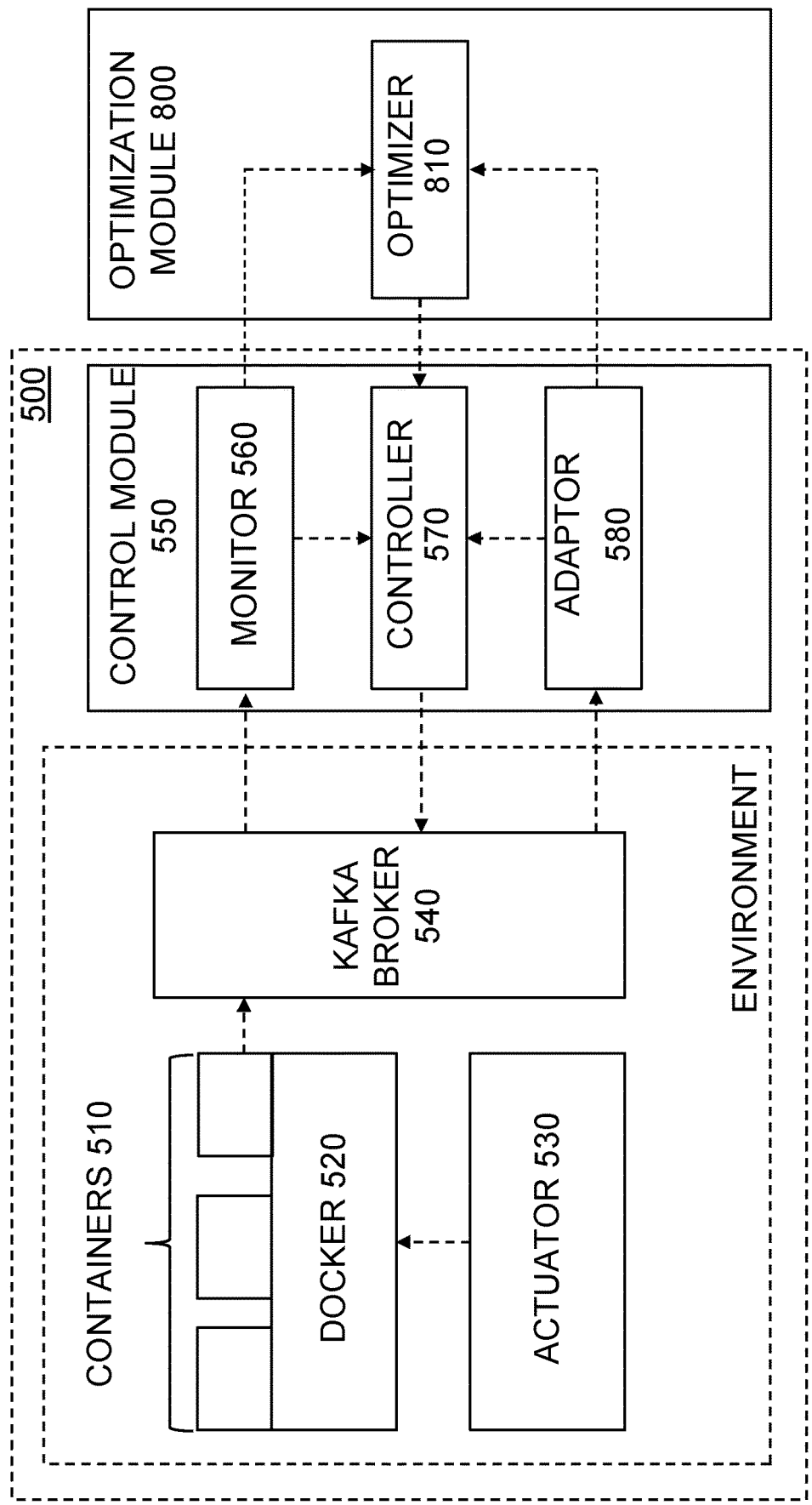
FIG. 8 illustrates an optimization module coupled with the control module of FIG. 5, according to one embodiment.

In order to rely on optimizations, the execution environment of FIG. 5 is modified, as shown in FIG. 8. An optimization module is coupled to the architecture of FIG. 5 and one optimization problem is solved at each iteration.

FIG. 8 illustrates an optimization module 800 coupled with the control module 550 of FIG. 5 (discussed above), according to at least one embodiment. As shown in FIG. 8, the optimization module 800 comprises an optimizer 810. The monitor 560 and adaptor 580 in the control module 550 send the current performance metrics (e.g., x(k) and current model parameters b (dynamic model of system x(k+1)=x (k)+b, respectively), to the optimization module 800. The optimization module 800 then employs the optimizer 810 to optimize for several steps ahead. The controller 570 in the control module 550 only takes and applies the immediate action. Lastly, the time it takes for the optimization module 800 to come up with a solution for 60 steps ahead and two concurrent executions is measured, in one exemplary implementation. It was found that the optimizer 810 takes, on average, 0.01 s at each call, which is negligible considering the lifespan of the workload.

For additional details of control system techniques that may be used in some embodiments, see, for example, X. Liu et al., "Adaptive Entitlement Control of Resource Containers on Shared Servers," *IFIP/IEEE International Symposium on Integrated Network Management*, pp. 163-176, May 2005; K. Hornik, "Approximation Capabilities of Multilayer Feedforward Networks," *Neural Networks*, Vol. 2, No. 4, 251-57, 1991; and/or K. Ogata and Y. Yang, Modern Control Engineering, India: Prentice Hall, 2002, which are incorporated by reference herein in their entirety.

Figure 9:
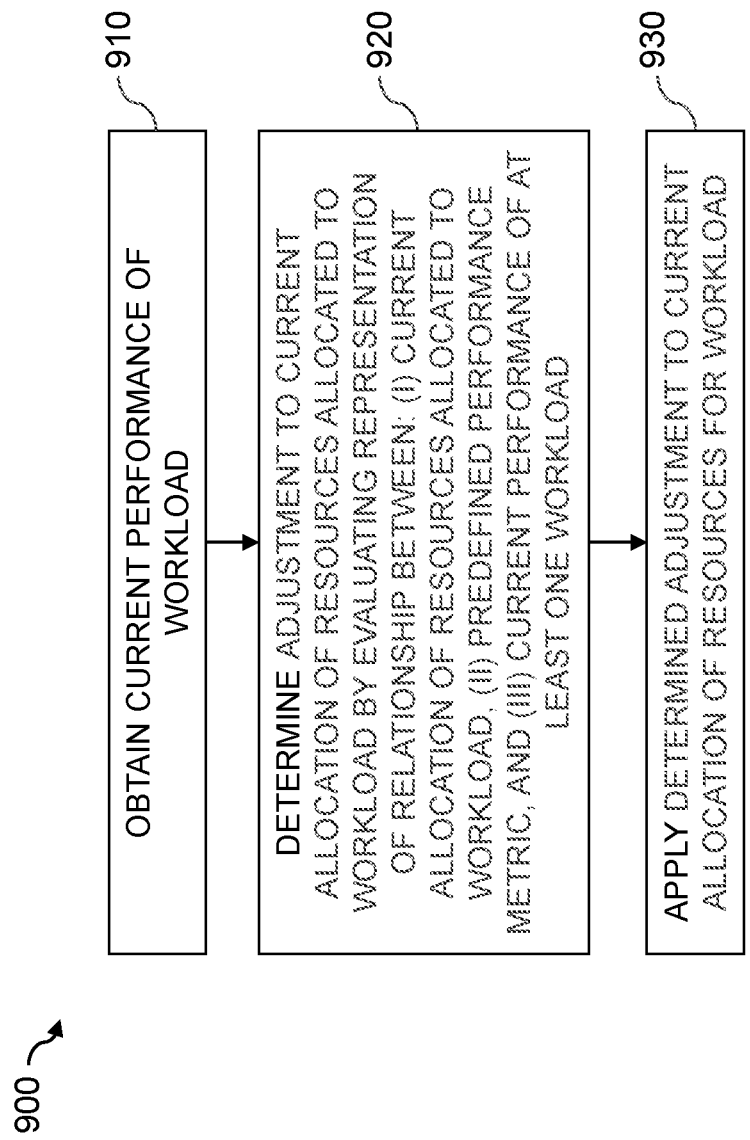
FIG. 9 is a flow chart illustrating an exemplary implementation of a resource allocation process for one or more workloads, according to one embodiment of the disclosure.

FIG. 9 is a flow chart illustrating an exemplary implementation of a resource allocation process 900 for one or more workloads, according to one embodiment of the disclosure. As shown in FIG. 9, the exemplary resource allocation process 900 initially obtains a current performance of a workload during step 910. Thereafter, the exemplary resource allocation process 900 determines an adjustment to a current allocation of one or more resources allocated to the workload during step 920 by evaluating a representation of a relationship between: (i) the current allocation of the resources allocated to the workload, (ii) a performance metric, and (iii) the current performance of the workload. Finally, the determined adjustment to the current allocation of the resources for the workload is initiated during step 930.

In some embodiments, the disclosed techniques for allocating resources for one or more workloads allow dynamic (e.g., on-the-fly) adaptations and improve profit generation by respecting the SLAs associated with the workloads with higher profit generation potential (or, the ones that lead to the highest fines, if not respected). One or more embodiments of the disclosure provide improved methods, apparatus and computer program products for resource allocation for one or more workloads. The foregoing applications and associated embodiments should be considered as illustrative only, and numerous other embodiments can be configured using the techniques disclosed herein, in a wide variety of different applications.

It should also be understood that the disclosed resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for resource allocation for one or more workloads may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
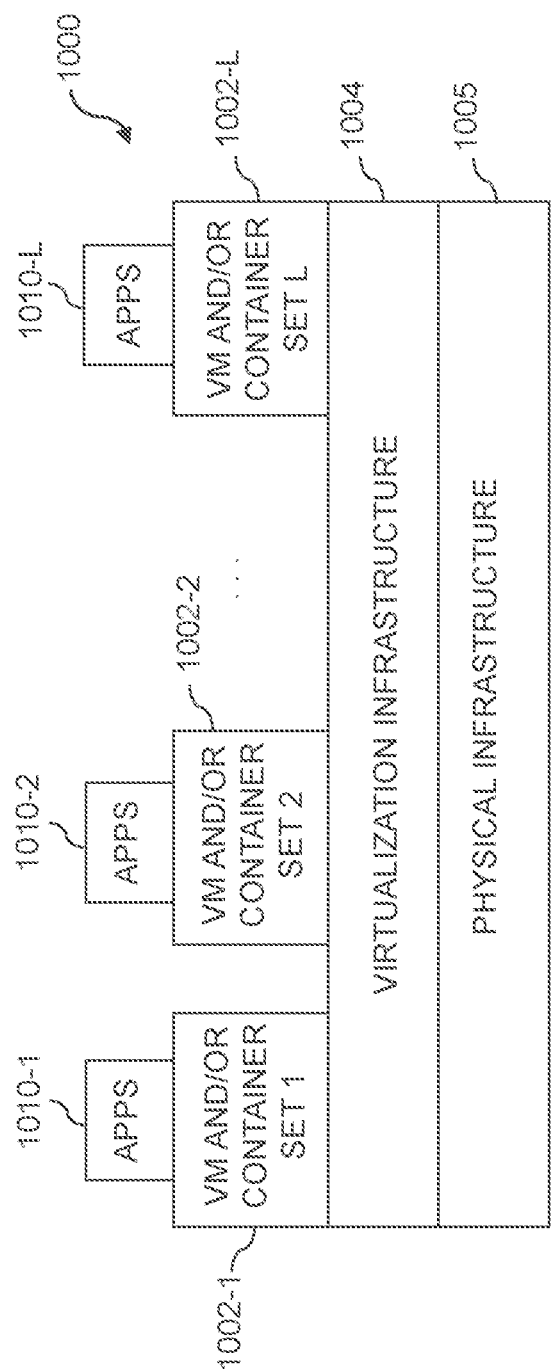
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the resource allocation system. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide resource allocation functionality of the type described above for one or more processes running on a given one of the VMs. For example, each of the VMs can implement resource allocation control logic for providing resource allocation for one or more workloads running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide resource allocation functionality of the type described above for one or more workloads running on different ones of the containers. For example, a container host device supporting multiple containers of one or more container sets can implement one or more instances of resource allocation control logic and for use in performing resource allocation for one or more workloads.

As is apparent from the above, one or more of the processing modules or other components of the disclosed system may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
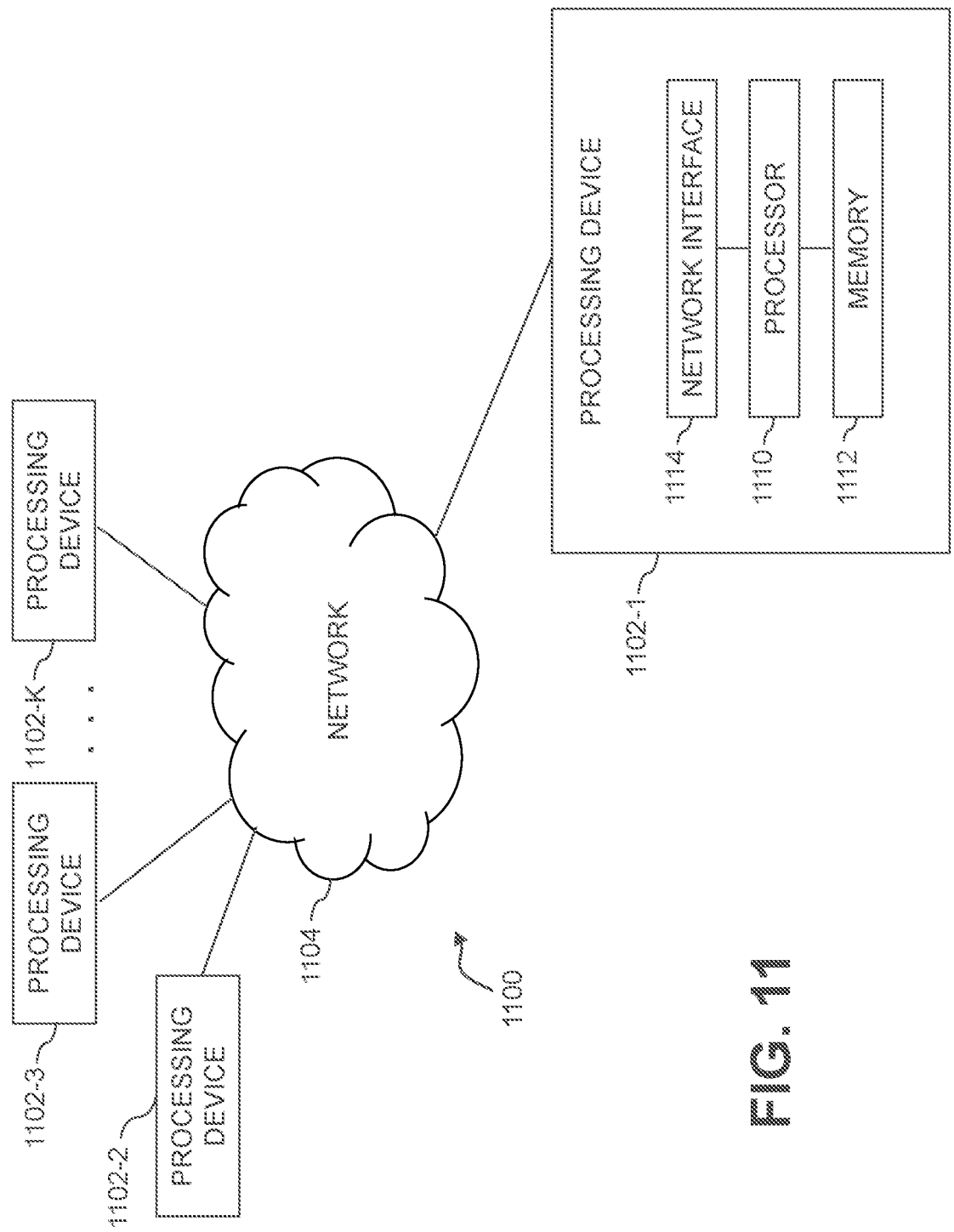
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the present disclosure will be readily apparent to those skilled in the art.

What is claimed is:

1. A method, comprising:

obtaining a current performance of at least one iterative workload;

determining an adjustment to a current allocation of at least one resource allocated to the at least one iterative workload by evaluating, for each iteration of the at least one iterative workload, a representation of a relationship between: (i) the current allocation of the at least one resource allocated to the at least one iterative workload, (ii) a performance metric, wherein a value of the performance metric is changed for at least one iteration of the at least one iterative workload and is maintained at least for the at least one iteration, and (iii) the current performance of the at least one iterative workload, wherein the determined adjustment to the current allocation of the at least one resource allocated to the at least one iterative workload is controlled to be between a first upper limit value and a second independent lower limit value and wherein one or more of the first upper limit value and the second independent lower limit value is: (i) changed for a plurality of iterations of the at least one iterative workload and (ii) determined using a percentage of the current allocation of the at least one resource; and initiating an application of the determined adjustment to the current allocation of the at least one resource for the at least one iterative workload, wherein the method is performed by at least one processing device comprising a processor coupled to a memory.

2. The method of claim 1, wherein the performance metric comprises a nominal value of a predefined service metric.

3. The method of claim 1, wherein the current performance of the at least one iterative workload comprises a current value of a variable that tracks a given predefined service metric of the at least one iterative workload.

4. The method of claim 3, wherein a current error of the variable that tracks the given predefined service metric of the at least one iterative workload comprises a difference between the current value of the given predefined service metric and a corresponding predefined target value for the given predefined service metric.

5. The method of claim 1, wherein the at least one iterative workload comprises one workload and wherein the representation comprises an analytic representation of a quadratic representation of the relationship.

6. The method of claim 1, wherein the at least one iterative workload comprises a plurality of workloads and wherein the representation comprises a quadratic representation of the relationship.

7. The method of claim 1, wherein a sum of the at least one resource is constrained to an available amount of the at least one resource.

8. An apparatus comprising:
at least one processing device comprising a processor coupled to a memory;
the at least one processing device being configured to implement the following steps:
obtaining a current performance of at least one iterative workload;
determining an adjustment to a current allocation of at least one resource allocated to the at least one iterative workload by evaluating, for each iteration of the at least one iterative workload, a representation of a relationship between: (i) the current allocation of the at least one resource allocated to the at least one iterative workload, (ii) a performance metric, wherein a value of the performance metric is changed for at least one iteration of the at least one iterative workload and is maintained at least for the at least one iteration, and (iii) the current performance of the at least one iterative workload, wherein the determined adjustment to the current allocation of the at least one resource allocated to the at least one iterative workload is controlled to be between a first upper limit value and a second independent lower limit value and wherein one or more of the first upper limit value and the second independent lower limit value is: (i) changed for a plurality of iterations of the at least one iterative workload and (ii) determined using a percentage of the current allocation of the at least one resource; and
initiating an application of the determined adjustment to the current allocation of the at least one resource for the at least one iterative workload.

9. The apparatus of claim 8, wherein the performance metric comprises a nominal value of a predefined service metric.

10. The apparatus of claim 8, wherein the current performance of the at least one iterative workload comprises a current value of a variable that tracks a given predefined service metric of the at least one iterative workload.

11. The apparatus of claim 10, wherein a current error of the variable that tracks the given predefined service metric of the at least one iterative workload comprises a difference between the current value of the given predefined service metric and a corresponding predefined target value for the given predefined service metric.

12. The apparatus of claim 8, wherein the at least one iterative workload comprises one workload and wherein the representation comprises an analytic representation of a quadratic representation of the relationship.

13. The apparatus of claim 8, wherein the at least one iterative workload comprises a plurality of workloads and wherein the representation comprises a quadratic representation of the relationship.

14. The apparatus of claim 8, wherein a sum of the at least one resource is constrained to an available amount of the at least one resource.

15. A non-transitory processor-readable storage medium having stored therein program code of one or more software programs, wherein the program code when executed by at least one processing device causes the at least one processing device to perform the following steps:
obtaining a current performance of at least one iterative workload;
determining an adjustment to a current allocation of at least one resource allocated to the at least one iterative workload by evaluating, for each iteration of the at least one iterative workload, a representation of a relationship between: (i) the current allocation of the at least one resource allocated to the at least one iterative workload, (ii) a performance metric, wherein a value of the performance metric is changed for at least one iteration of the at least one iterative workload and is maintained at least for the at least one iteration, and (iii) the current performance of the at least one iterative workload, wherein the determined adjustment to the current allocation of the at least one resource allocated to the at least one iterative workload is controlled to be between a first upper limit value and a second independent lower limit value and wherein one or more of the first upper limit value and the second independent lower limit value is: (i) changed for a plurality of iterations of the at least one iterative workload and (ii) determined using a percentage of the current allocation of the at least one resource; and
initiating an application of the determined adjustment to the current allocation of the at least one resource for the at least one iterative workload.

16. The non-transitory processor-readable storage medium of claim 15, wherein the performance metric comprises a nominal value of a predefined service metric.

17. The non-transitory processor-readable storage medium of claim 15, wherein the current performance of the at least one iterative workload comprises a current value of a variable that tracks a given predefined service metric of the at least one iterative workload.

18. The non-transitory processor-readable storage medium of claim 17, wherein a current error of the variable that tracks the given predefined service metric of the at least one iterative workload comprises a difference between the current value of the given predefined service metric and a corresponding predefined target value for the given predefined service metric.

19. The non-transitory processor-readable storage medium of claim 15, wherein the at least one iterative workload comprises one iterative workload and wherein the representation comprises an analytic representation of a quadratic representation of the relationship.

20. The non-transitory processor-readable storage medium of claim 15, wherein the at least one iterative workload comprises a plurality of workloads and wherein the representation comprises a quadratic representation of the relationship.

* * * * *

UNITED STATES PATENT AND TRADEMARK OFFICE
CERTIFICATE OF CORRECTION

PATENT NO. : 11,868,810 B2  
APPLICATION NO. : 16/741962  
DATED : January 9, 2024  
INVENTOR(S) : Calmon et al.

Page 1 of 1

It is certified that error appears in the above-identified patent and that said Letters Patent is hereby corrected as shown below:

In the Claims

Column 18, Lines 47-49, in Claim 19, replace "The non-transitory processor-readable storage medium of claim 15, wherein the at least one iterative workload comprises one iterative workload and wherein the" with -- The non-transitory processor-readable storage medium of claim 15, wherein the at least one iterative workload comprises one workload and wherein the --

Signed and Sealed this  
Fifth Day of March, 2024

Katherine Kelly Vidal  
*Director of the United States Patent and Trademark Office*